United States Patent [19]

Jackson

[11] Patent Number: 4,872,977
[45] Date of Patent: Oct. 10, 1989

[54] SOLID WASTE RETRIEVER

[76] Inventor: Davis G. Jackson, 3927 Lorna Rd., Birmingham, Ala. 35244

[21] Appl. No.: 249,412

[22] Filed: Sep. 26, 1988

[51] Int. Cl.[4] .............................. B07B 1/00; E02F 3/40
[52] U.S. Cl. ......................................... 210/173; 37/70; 37/117.5; 209/421
[58] Field of Search .................... 37/4, 9, 70, 71, 94, 37/189, DIG. 15, 117.5; 209/421; 210/153, 170, 173, 269, 271, 523; 414/724; 198/642

[56] References Cited

U.S. PATENT DOCUMENTS

| | | | |
|---|---|---|---|
| 2,631,834 | 3/1953 | Butzow | 37/9 |
| 3,142,341 | 7/1964 | Biasi | 209/421 |
| 3,461,968 | 8/1969 | Longley | 209/421 |
| 3,473,185 | 10/1969 | Bahr | 210/523 |
| 3,614,837 | 10/1971 | Aroka | 37/189 |
| 3,783,537 | 1/1974 | Penote et al. | 37/94 |
| 4,257,178 | 3/1981 | Spradlin | 37/189 |
| 4,698,150 | 10/1987 | Wigoda | 37/4 |

FOREIGN PATENT DOCUMENTS

| | | | |
|---|---|---|---|
| 0787564 | 12/1980 | Japan | 37/71 |
| 0787558 | 12/1980 | U.S.S.R. | 37/189 |

Primary Examiner—Richard V. Fisher
Assistant Examiner—Joseph Drodge
Attorney, Agent, or Firm—Jennings, Carter, Thompson & Veal

[57] ABSTRACT

A solid waste retrieval device utilizes a rotating drum carrying a plurality of teeth to lift dried sludge from an underlying sand bed such that substantially no sand is removed with the sludge. The device moves over the sludge and compresses it beneath a forward rolled radius section to prevent buckling and disruption of the sludge ahead of the device.

14 Claims, 5 Drawing Sheets

SOLID WASTE RETRIEVER

FIELD OF THE INVENTION

The present invention relates to solid waste management and more particularly to the management of dried sludge by-products of municipal sewage treatment facilities. Even more particularly my invention relates to the removal of dried sludge from the surface of filtration sand beds used to separate the effluent from the sludge. In even greater particularity my invention may be characterized as a mechanical retriever for collecting sludge into a transport bin without appreciable collection of the underlying sand bed.

BACKGROUND OF THE INVENTION

As is well known there exist numerous methods of treating municipal sewage to separate it into an effluent portion and a sludge portion. In one treatment process of this type, liquid sewage is pumped into generally rectangular filtration beds. These filtration beds are bounded by cement retaining walls and contain layers of gravel overlain by a depth of sand, with underlying drain outlets. In the treatment process, such filtration beds are covered with liquid sewage to a depth of between 12 to 16 inches. The liquid portion is gravitationally filtered through the sand and gravel and is removed from beneath the gravel through the outlets for further processing. The residue or sludge remains atop the sand and gradually dries into a cake of solid waste approximately two inches thick.

When the sludge has dried it must be removed from the filtration bed so that the treatment process can be repeated. A minimum amount of sand should be removed with the sludge for obvious economic and efficiency reasons. Current practice is to remove the sludge manually by using a crew of several workmen with pitchforks and shovels. Therefore it is clear that the removal aspect of the treatment process is a labor and time-consuming operation.

Mechanical solutions to eliminate the labor intensive aspects of removal of the sludge from the bed have been attempted. In particular removal of the sludge using a landscape rake of the type known as a "ROCK HOUND" ® manufactured by KEM Enterprises, Inc. was attempted. The results were not satisfactory because the consistency of the sludge and the underlying sand was such that movement of the device over the sludge caused the sludge to buckle and accumulate at the front of the device. Thus, the landscape rake quickly became little more than a plow or scraper.

SUMMARY OF THE INVENTION

It is the principal object of the present invention to mechanize the task of sludge removal from filtration beds, thereby reducing the expense of such operations by reducing the labor costs involved and increasing the rate at which the beds can be iteratively utilized.

Another object of the invention is to remove the sludge from the filtration bed without removal of a substantial quantity of sand from the bed.

Yet another object of the invention is to prepare the surface of the bed for maximum efficiency for subsequent drying of liquid sewage.

These and other objects and advantages are accomplished in my invention by specifically tailoring my device to its environment of use and providing a combination of features which enable the device to traverse the sand/sludge surface without significant undesired disruption thereof. My invention is designed to be used with an articulated loader as the drive unit which supports and moves the apparatus about in the filtration bed. I have provided a specially designed bucket or bin to receive and transport sludge therewithin. The bin has a generally flat bottom which rests atop sludge to be removed. The bottom merges with a rolled radius section formed at the junction of the bottom and a forward wall. That is to say, the bin has a rolled radius surface formed on the side thereof corresponding to the intended direction of travel. The bin is open on the side thereof opposite the rolled radius section and an adjustable rotor assembly is mounted to the bin adjacent the open side for lifting the sludge from the sand of the bed into the bin.

BRIEF DESCRIPTION OF THE DRAWINGS

Apparatus embodying features of my invention are depicted in the accompanying drawings which form a portion of this disclosure and wherein.

DESCRIPTION OF THE PREFERRED EMBODIMENT

Figure 1:
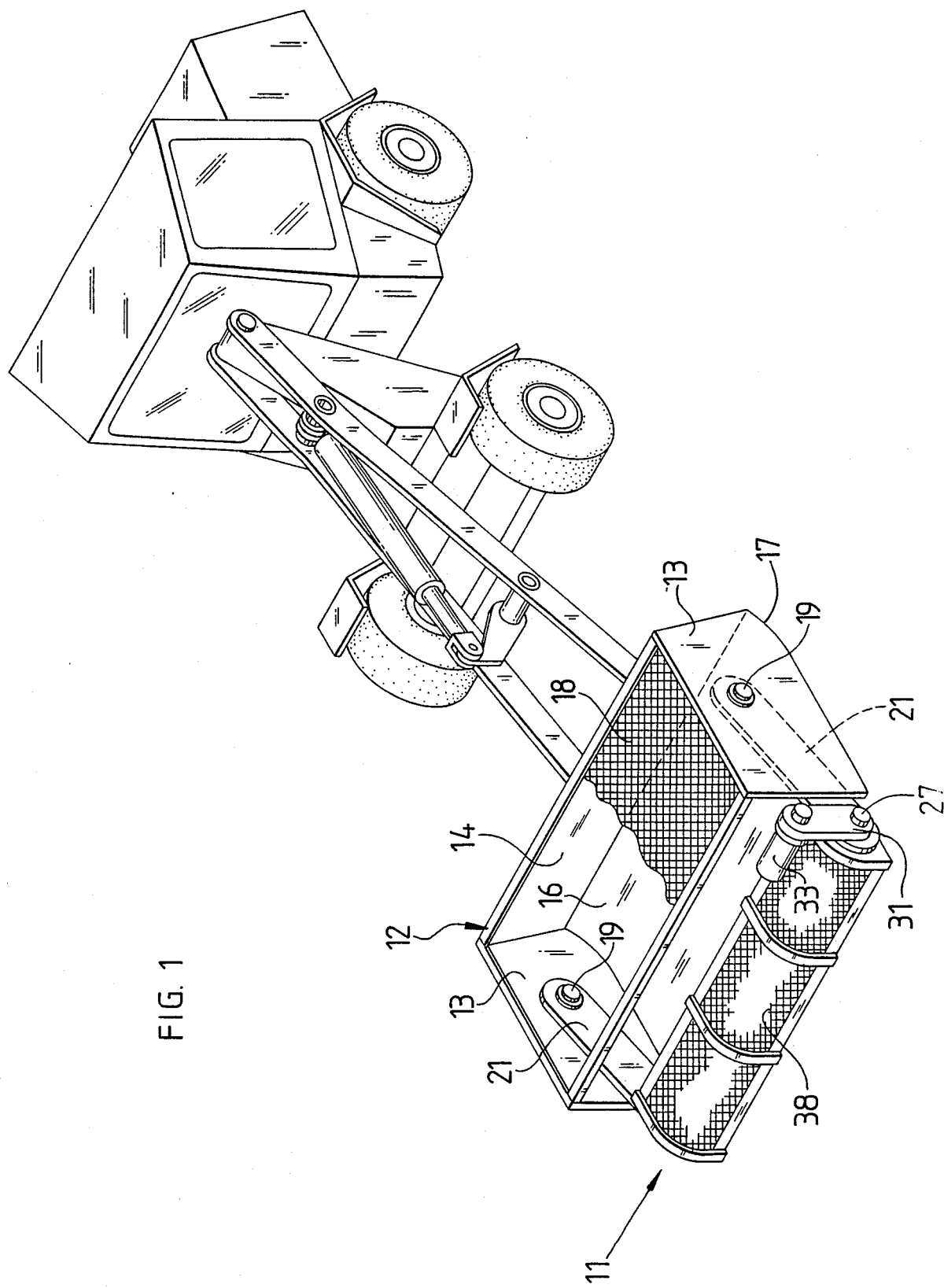
FIG. 1 is a perspective view of my apparatus used in conjunction with an articulated loader.

Referring to the drawings for a clearer understanding of the invention, it will be noted that my solid waste retriever shown generally at 11, is an attachment for use with an articulated loader. It should be understood that due to the nature of the sludge and sand in the filtration bed a skid-steer type loader would severely disrupt the sludge and sand and intermingle the materials to an unacceptable degree.

Figure 2:
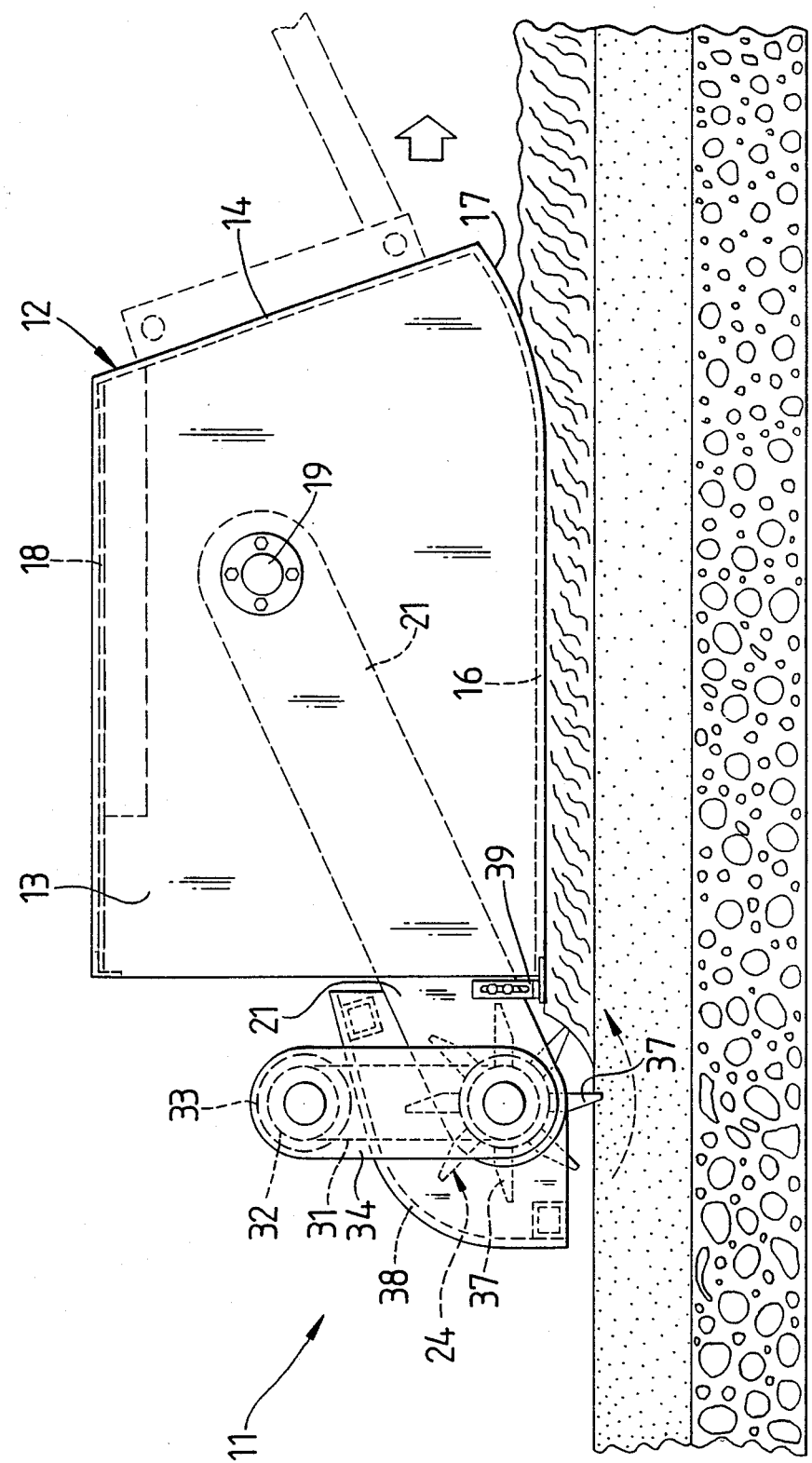
FIG. 2 is a side elevational view of my apparatus resting atop a layer of sludge.
Figure 3:
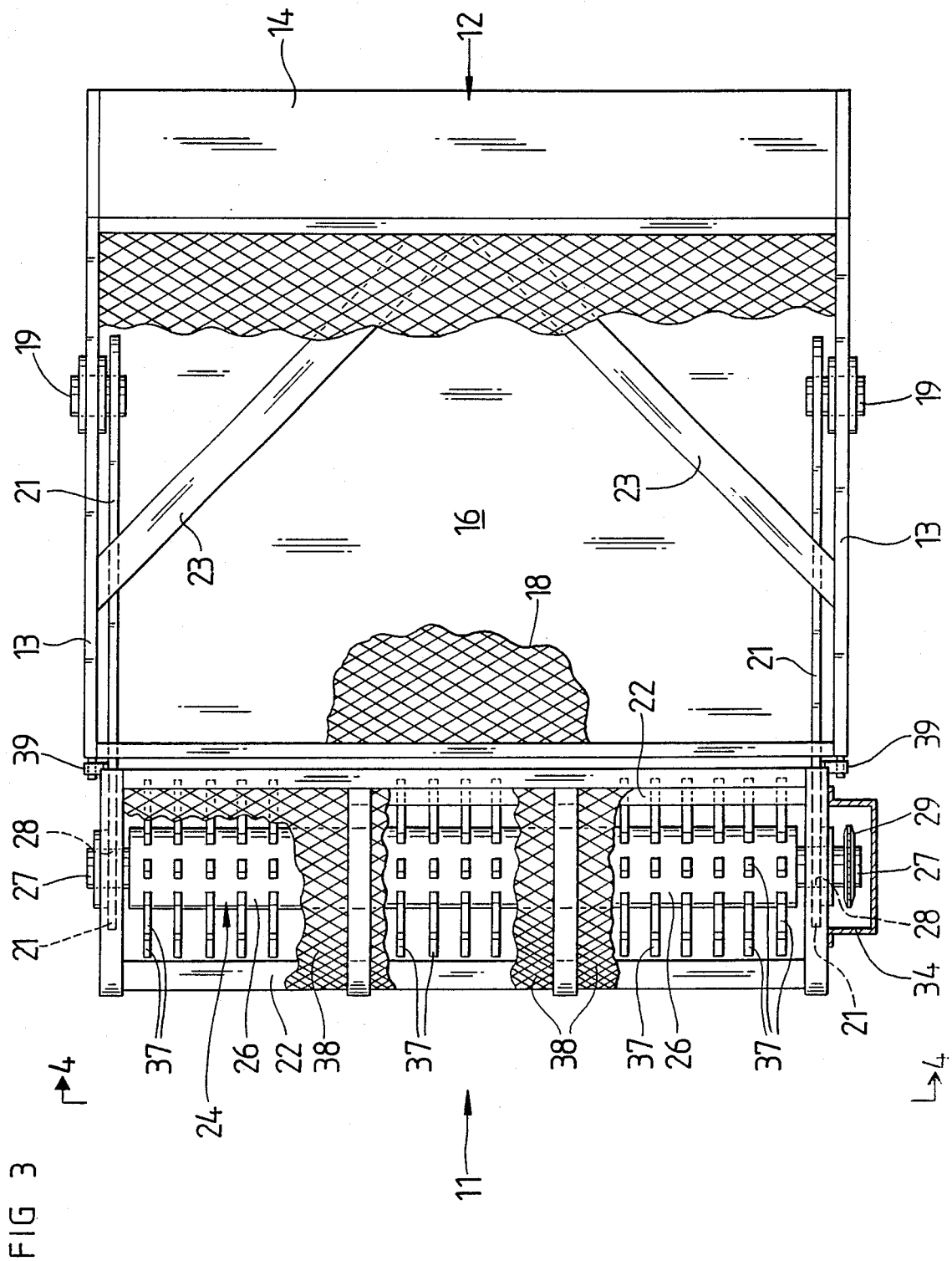
FIG. 3 is a plan view of my apparatus.
Figure 4:
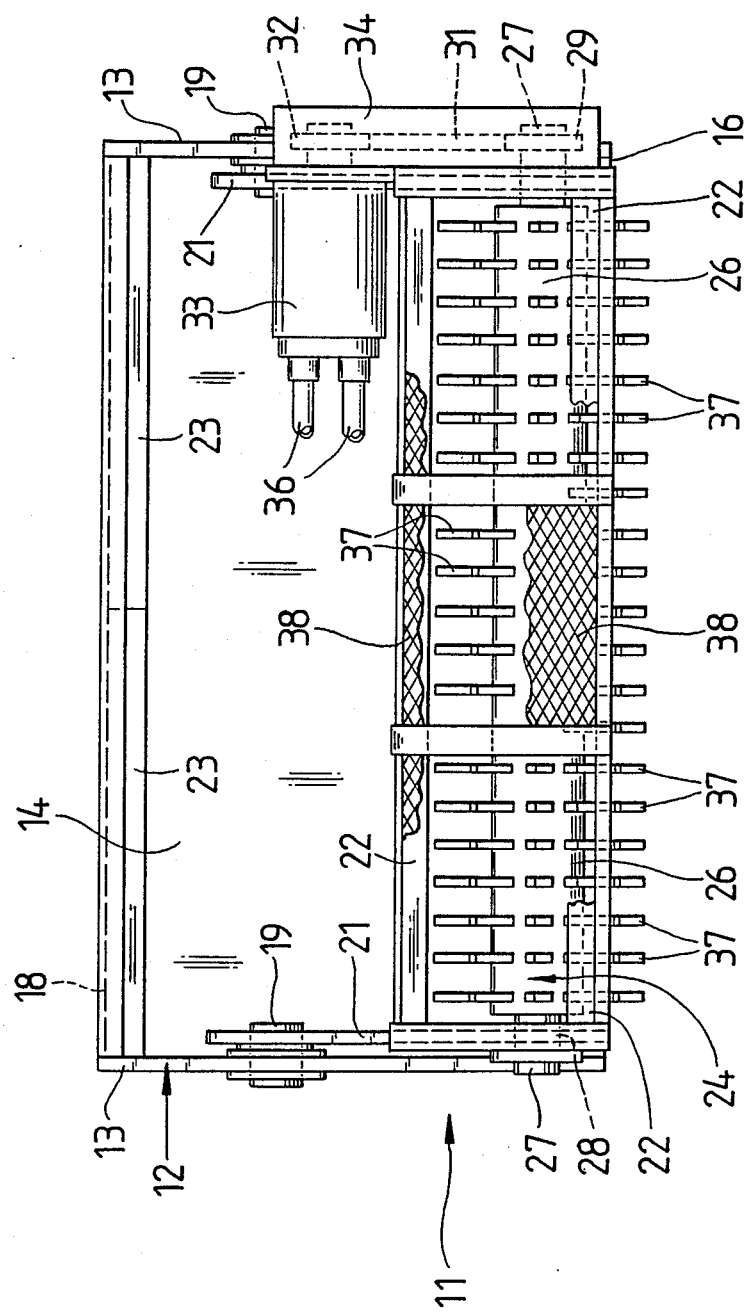
FIG. 4 is an elevational view taken along line 4—4 of FIG. 3.
Figure 5:
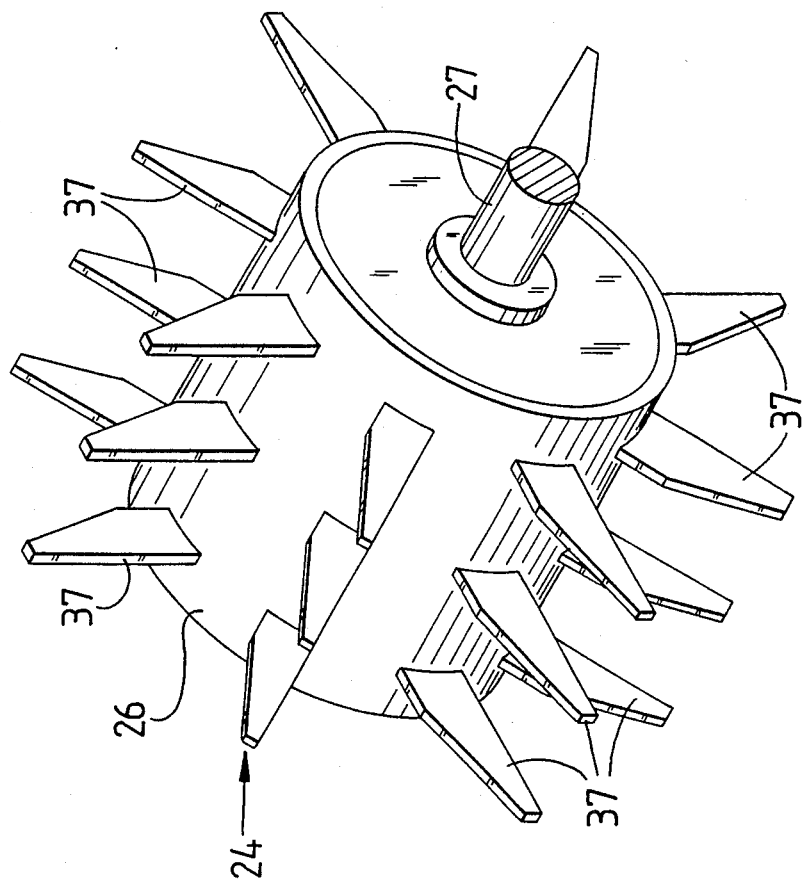
FIG. 5 is a partial perspective view of one end of the rotor assembly.

As best seen in FIGS. 1 & 2, my retriever has a bin 12 formed by three generally vertical walls including two side walls 13 and a forward wall 14 which also serves as the point of attachment for the articulated loader. Note that details of the physical attachment to the loader have been omitted in as much as each loader manufacturer has a variation in their attachment scheme, therefore the means of attachment to the loader is a matter of choice and does not constitute a portion of my invention. The side of the bin 12 opposite the forward wall 14 is open and does not have a solid barrier thereover, as may be seen in FIGS. 4 & 5. The bin 12 has a flat bottom 16 that transitions from flat to a rolled radius section 17 proximal the forward wall 14. The side walls 13 are defined at their lower forward extremities by the curvature of the rolled radius section 17. Referring to FIG. 3, an expanded metal screen supported by the walls 13 and 14 form the top 18 of the bin 12 and allows an operator seated on the loader to visually determine when the bin 12 is full.

Each side wall 13 has an aligned pivot stub 19 mounted therein, with each stub supporting a rigid arm member 21 for pivotal motion about a common axis passing through the center of the pivot stubs 19. The arm members 21 are mounted internally of the bin 12 and extend rearwardly beyond the side walls 13 and bottom 16 by about six inches. A bracing tube 22 such as a two inch square tube is connected to each arm member 21 proximal the rearward end such that the arm members 21 are constrained to remain in the same plane as they pivot about the common axis. Additional bracing 23 stabilizes the tops of sidewalls 13. Disposed between the free ends of the arm member 21 is a rotor 24, which is essentially a five inch diameter drum 26 which is supported on a pair of stub shafts 27 extending through apertures 28 in the arm member 21 on either end of the drum 26. A sprocket 29 is affixed to the rotor at one end thereof and engages a drive chain 31 which also passes over an output sprocket 32 of a reversible hydraulic motor 33 mounted on the bracing tube 22 and bracing 23. A chain guard 34 is provided about the sprockets and chain 31. Conventional hydraulic lines 36 are used to connect the hydraulic motor to a remote hydraulic drive on the loader.

Affixed to the drum 26 are twelve longitudinally extending rows of steel teeth 37. Each tooth 37 extends radially about three inches having a thickness of about 3/16 inch. Each tooth 37 tapers in width from one inch proximal the drum to 3/16 inch at the outermost tip with one side of the tooth 37 remaining normal to the surface of the drum 26. The teeth in each row are spaced about two inches apart from center to center, and each row is offset from each adjacent row by one inch. A screen guard 38 is supported on arm member 21 and extends rearwardly of and above the rotor 24 to prevent accidental contact with the rotary teeth 37. A stop member 39 is mounted to the lower rear edge of each of the side walls and provides selective incremental adjustment of the work height of the arm member 21. This stop member 39 allows the teeth 37 to be adjusted up to three inches above or below the bottom 16 of the bin 12.

In operation the articulated loader is driven to one end of the filtration bed where the solid waste retriever 11 is lowered onto the sludge. The weight of the retriever 11 is sufficient to compress the sludge to a thickness obtainable by the teeth. Thus with the teeth 37 set at a predetermined penetration beneath the bottom 16, the entire thickness of the sludge is accessible. With the bin 12 resting on the sludge, the hydraulic motor 33 drives the rotor 24 in a first direction such that sludge adjacent the rear edge of the bottom 16 is propelled into the bin. Since the teeth 37 only touch the top one-quarter inch of sand at one inch intervals virtually no loose sand is carried from the bed into the bin 12. The loader then slowly backs across the filtration bed pulling the solid waste retriever 11 across the surface of the sludge. As the retriever 11 advances the sludge is gradually compressed beneath the rolled radius section 17 so that no sludge accumulates ahead of the bin 12. As the sludge exits beneath the rear of the bin 12, the teeth 37 propel it into the bin 12. When the bin 12 is filled the loader raises the bin 12 and empties it into a truck or other receptacle outside the filtration bed. Note that the arm members are free to pivot to provide a clear path for the egress of the sludge. It will be appreciated that the sludge is substantially disrupted in the removal process and is therefore easily dumped from the bin 12.

When the filtration bed has been cleared of sludge, the solid waste retriever 11 may be used to prepare the bed for another quantity of waste water. Previously the beds were disrupted by the workmen walking and working thereon. Oftentimes the sand would be left uneven which results in uneven depth of waste and uneven drying times. To prevent this and to aerate the filtration bed, the solid waste retriever 11 is positioned at one end of the bed, resting directly on the sand with the rotor 24 turning counter to its previous rotation and engaging the top ¾ inches of sand. The sand is thrown upwardly through the screen guard 38 as the solid waste retriever 11 is pulled over the entire bed, thereby leaving a smooth aerated bed of sand for the next cycle of operation.

While my invention is simple in its operation, it should be appreciated that no known device has heretofore been able to traverse surfaces of the sludge and effectively and efficiently separate the sludge from the sand. Furthermore my device has been experimentally tested and has been shown to accomplish the the work of a full crew removing sludge from a filtration bed in less than one-fifth the time with a single inexperienced operator driving the loader.

While I have shown my invention to one form, it will be obvious to those skilled in the art that it is not so limited but is susceptible of various changes and modifications without departing from the spirit thereof.

What I claim is:

1. Apparatus for removing sludge from an underlying sand bed in combination with an articulated loader having a hydraulic drive unit for powering an auxiliary attachment and having a movable loader arm, comprising:
   (a) a sludge receiving bin operatively connected to and movable concomitantly with an articulated loader, having a generally flat imperforate bottom terminating in a rolled radius curved section which is joined to a first wall, with said rolled radius curved section forming the leading edge of said sludge receiving bin such that movement of said bin over dried sludge causes compression of said sludge beneath said curved section and said flat bottom, and a pair of substantially vertical sidewalls affixed to said flat bottom and said first wall;
   (b) a pair of rigid arm members with each arm member of said pair mounted to one of said sidewalls for pivotal motion about a common axis passing through one end of said arm member and through said sidewalls; and
   (c) a rotor assembly supported by said pair of rigid arms distal said one end, proximal said flat bottom and having a plurality of rigid teeth extending therefrom for urging dried sludge into said bin.

2. Apparatus as defined in claim 1 further comprising means for holding said arm members in a common plane.

3. Apparatus as defined in claim 1 wherein said rotor assembly comprises:
   (a) an elongated drum extending between and supported by said pair of rigid arm members and supporting said rigid teeth thereon in uniform spaced relation; and
   (b) a hydraulic motor mounted in said pair of arm members and operatively connected to said drum so as to drive said drum about its longitudinal axis.

4. Apparatus as defined in claim 3 wherein said hydraulic motor is connected to said drum by a drive chain engaging a sprocket affixed to said drum and an output sprocket mounted to said hydraulic motor.

5. Apparatus as defined in claim 3 wherein said teeth are affixed to said drum to form longitudinal rows of teeth with the teeth of each row offset from adjacent teeth.

6. Apparatus as defined in claim 3 further comprising a screen guard spaced radially above and behind said rotor and extending along the length thereof.

7. Apparatus as defined in claim 3 further comprising means for adjusting the height of said drum relative to said flat bottom.

8. Apparatus for removing dried sludge from an underlying sand bed when urged thereacross by an associated propelling device comprising:
 (a) a sludge receiving bin having a smooth imperforate bottom surface adapted to slide over said sludge with minimal resistance such that dried sludge forward of said bin is not disrupted as said receiving bin is urged thereacross, said sludge a closed forward end with a rolled radius curved section and
 (b) a rotor assembly mounted for selective positioning adjacent said open rear end for lifting dried sludge emerging from below said bin thereinto; and
 (c) a propelling device operatively connected to said bin.

9. Apparatus as defined in claim 8 wherein said bin includes a generally flat bottom and a forward wall adapted for connection to said propelling device with said bottom and said forward wall connected to said rolled radius section such that initial contact with said sludge forward of said bin during relative motion therebetween occurs at said rolled radius section.

10. Apparatus as defined in claim 9 wherein said rotor assembly comprises:
 (a) an elongated rotor extending across the open rear end of said bin having a plurality of radially extending rigid teeth thereon;
 (b) means for selectively supporting said rotor at a predetermined height relative to said generally flat bottom; and
 (c) means for driving said rotor about the longitudinal axis thereof.

11. Apparatus as defined in claim 10 wherein said means for selectively supporting said rotor comprises:
 (a) a pair of rigid arm members supporting said rotor at each end thereof with each arm member pivotally mounted to said bin for movement in a vertical plane about a common axis; and
 (b) means for retaining said arm member in a common plane passing through said common axis.

12. Apparatus as defined in claim 10 wherein said rotor comprises a drum and said teeth are affixed thereto in rows extending longitudinally of said drum with each tooth in each row staggered relative to the teeth in adjacent rows.

13. Apparatus as defined in claim 12 further comprising a screen guard extending rearwardly and upwardly from said rotor assembly and supported thereby.

14. Apparatus as defined in claim 10 wherein said means for driving said rotor comprises a hydraulic motor operatively connected to said rotor.

* * * * *